(12) United States Patent
Good

(10) Patent No.: US 11,898,659 B1
(45) Date of Patent: Feb. 13, 2024

(54) METHOD AND APPARATUS FOR FLOW RESTRICTION

(71) Applicant: LANCER CORPORATION, San Antonio, TX (US)

(72) Inventor: Merrill R. Good, San Antonio, TX (US)

(73) Assignee: Lancer Corporation, San Antonio, TX (US)

( * ) Notice: Subject to any disclaimer, the term of this patent is extended or adjusted under 35 U.S.C. 154(b) by 0 days.

(21) Appl. No.: 17/953,805

(22) Filed: Sep. 27, 2022

(51) Int. Cl.
    *F16K 5/10*     (2006.01)
    *F16B 33/02*     (2006.01)

(52) U.S. Cl.
    CPC ............... *F16K 5/10* (2013.01); *F16B 33/02* (2013.01)

(58) Field of Classification Search
    CPC . F16K 5/10; F16K 47/06; F16K 47/12; F16B 33/02; F16L 55/02772
    USPC .............................. 251/121, 126; 138/42, 46
    See application file for complete search history.

(56) References Cited

U.S. PATENT DOCUMENTS

| | | | | |
|---|---|---|---|---|
| 2,312,834 A | * | 3/1943 | Hahn | F23Q 9/00 138/42 |
| 2,323,115 A | * | 6/1943 | Bryant | G05D 13/00 415/72 |
| 2,658,529 A | | 10/1953 | Hensley | |
| 3,091,213 A | * | 5/1963 | Maskell | A62B 9/006 251/216 |
| 3,095,006 A | * | 6/1963 | Smith | F16K 47/10 251/117 |
| 3,384,338 A | * | 5/1968 | Dermody | F16K 47/06 251/216 |
| 2005/0224737 A1 | * | 10/2005 | Mihaylov | F16K 47/12 251/126 |
| 2016/0098043 A1 | * | 4/2016 | Maeda | F16K 47/06 700/282 |

\* cited by examiner

*Primary Examiner* — Marina A Tietjen
(74) *Attorney, Agent, or Firm* — Christopher L. Makay

(57) ABSTRACT

An adjustable flow restrictor includes a nut, an adjustment screw, and a sleeve. The adjustment screw installs into the nut whereby the adjustment screw and the nut define a pathway therebetween. Adjustment of the adjustment screw relative to the nut varies the pathway with respect to a length thereof. The sleeve fits over the adjustment screw and mates with the nut in order to define a chamber with an outlet. The pathway receives therein a liquid conveyed to the nut and communicates the liquid to the chamber for exit therefrom via the outlet. Adjusting the length of the pathway sets the volumetric flow rate of the liquid traversing the pathway such that the liquid exiting the outlet flows therefrom at a desired volumetric flow rate.

20 Claims, 7 Drawing Sheets

METHOD AND APPARATUS FOR FLOW RESTRICTION

BACKGROUND OF THE INVENTION

1. Field of the Invention

The present invention relates to flow restriction, and, more particularly, but not by way of limitation, to an adjustable flow restrictor with fine adjustments that provide precise flow rate settings.

2. Description of the Related Art

Various industries, such as, for example, the medical and food and beverage industries, require flow restriction devices providing precise flow rate settings that deliver a repeatable amount of a liquid, such as, for example, a medicine or beverage. In the instance of a medicine, a variation in the amount may result in serious harm to the patient. Although a beverage delivered from a post-mix beverage dispenser with incorrect amounts of a concentrate and diluent and a flavor additive if desired results only in a poor tasting drink, customers expect proper tasting beverages. Post-mix beverage dispensers in order to deliver a proper tasting beverage must maintain over variable inlet pressures a desired flow rate ratio between a first liquid flow such as concentrate and a second liquid flow such as diluent and if desired a third liquid flow such as flavor additive. Desired flow rate ratios for typical post-mix beverages include 4:1 to 8:1 diluent to concentrate, while optional flavor additives include 30:1 diluent to flavor additive. The inlet pressures of the diluent, concentrate, and flavor additives for a post-mix beverage dispenser range from 20 psi to 80 psi depending upon the municipal water supply pressure and the supply pressure developed by ingredient pumps and the length of the supply lines. In light of the foregoing, delivering diluent and concentrate and if desired flavor additive separately for later combination creates the challenge of maintaining a correct diluent to concentrate/flavor additive ratio.

A flow restrictor currently in use to deliver a desired amount of a liquid such as a diluent, concentrate, or flavor additive includes a Brix screw, which is a manually adjustable plug valve with a side port having a circular or trapezoidal shape. A technician adjusts the plug valve to vary the size of the opening from the side port and thus the rate of diluent, concentrate, or flavor additive flow from the Brix screw. Although Brix screws operate adequately to set the flow of diluent, concentrate, or flavor additive therethrough, Brix screws, due to the operation thereof via changes in the cross-sectional area of the side port, offer coarse adjustments that limit the ability of Brix screws to provide precise flow rate settings. Brix screws accordingly are often inadequate in delivering an exact desired amount of a liquid such that, in the instance of a post-mix dispenser, Brix screws do not supply over variable inlet pressures a desired correct diluent to concentrate/flavor additive ratio.

Accordingly, an adjustable flow restrictor including fine adjustments that allow a setting of precise flow rates would improve over current flow restrictors.

SUMMARY OF THE INVENTION

In accordance with the present invention, an adjustable flow restrictor includes a nut, an adjustment screw, and a sleeve. The nut includes a first end adapted to receive a liquid therein and a second end. The adjustment screw installs into the nut from the second end thereof such that the adjustment screw and the nut define a pathway therebetween. Adjustment of the adjustment screw relative to the nut varies the pathway with respect to a length thereof. The sleeve includes a first end and a second end. The sleeve at the first end fits over the adjustment screw and mates with the nut at the second end in order to define a chamber with an outlet.

The pathway receives therein a liquid conveyed to the nut at the first end thereof and communicates the liquid to the chamber for exit therefrom via the outlet. Adjusting the length of the pathway regulates the liquid traversing the pathway with respect to volumetric flow rate such that the liquid exiting the outlet flows therefrom at a desired volumetric flow rate. More particularly, adjusting the adjustment screw relative to the nut to decrease the length of the pathway results in an increase in the volumetric flow rate of the liquid delivered from the outlet. Conversely, adjusting the adjustment screw relative to the nut to increase the length of the pathway results in a decrease in the volumetric flow rate of the liquid delivered from the outlet.

The adjustment screw includes a head and a shaft extending from the head whereby the shaft includes external threads. The nut defines a passage therethrough including internal threads truncated to produce truncated internal threads. The adjustment screw at the shaft thereof installs into the nut from the second end thereof such that the truncated internal threads of the nut and the external threads of the shaft for the adjustment screw are spaced apart to form the pathway. In accordance therewith, the pathway comprises a helical flow path located between the truncated internal threads of the nut and the external threads of the shaft for the adjustment screw that travels about the shaft of the adjustment screw along a segment thereof installed within the nut. Adjusting the adjustment screw to retract the shaft thereof relative to the nut decreases the length of the pathway through decreasing the helical flow path between the truncated internal threads of the nut and the external threads of the shaft for the adjustment screw with respect to a number of turns therein, resulting in a decrease duration of liquid contact with the pathway and frictional energy losses of the liquid as the liquid traverses the pathway and a corresponding increase in the volumetric flow rate of the liquid delivered from the outlet. Conversely, adjusting the adjustment screw to progress the shaft thereof into the nut increases the length of the pathway through increasing the helical flow path between the truncated internal threads of the nut and the external threads of the shaft for the adjustment screw with respect to a number of turns therein, resulting in an increase in duration of liquid contact with the pathway and frictional energy losses of the liquid as the liquid traverses the pathway and a corresponding decrease in the volumetric flow rate of the liquid delivered from the outlet.

The external threads of the shaft for the adjustment screw include roots and crests. The internal threads of the nut include roots and truncated crests that produce the truncated internal threads. Installation of the adjustment screw at the shaft thereof into the nut from the second end thereof fits the crests of the external threads of the shaft for the adjustment screw fit within the roots of the internal threads of the nut, whereas the truncated crests of the internal threads of the nut and the roots of the external threads of the shaft for the adjustment screw are spaced apart to form the pathway. The pathway comprises a helical flow path located between the truncated crests of the internal threads of the nut and the roots of the external threads of the shaft for the adjustment screw that travels about the adjustment screw along a segment thereof installed within the nut. Adjusting the adjustment screw to retract the shaft thereof relative to the nut decreases the length of the pathway through decreasing the helical flow path between the truncated crests of the internal threads of the nut and the roots of the external threads of the shaft for the adjustment screw with respect to a number of turns therein, resulting in a decrease in duration of liquid contact with the pathway and frictional energy losses of the liquid as the liquid traverses the pathway and a corresponding increase in the volumetric flow rate of the liquid delivered from the outlet. Conversely, adjusting the adjustment screw to progress the shaft thereof into the nut increases the length of the pathway through increasing the helical flow path between the truncated crests of the internal threads of the nut and the roots of the external threads of the shaft for the adjustment screw with respect to a number of turns therein, resulting in an increase in duration of liquid contact with the pathway and frictional energy losses of the liquid as the liquid traverses the pathway and a corresponding decrease in the volumetric flow rate of the liquid delivered from the outlet.

The nut includes a first raised wall and a second raised wall extending from the second end thereof. The first raised wall and the second raised wall are spaced apart about the second end to define the outlet of the chamber and a gap across from the outlet. The sleeve includes a raised wall extending from the first end. During mating of the sleeve at the first end thereof with the nut at the second end thereof, the raised wall of the sleeve inserts into the gap between the first and second raised walls of the nut such that the raised wall of the sleeve, the first raised wall of the nut, and the second raised wall of the nut define a chamber wall of the chamber that directs liquid received into the chamber from the pathway toward the outlet for delivery therefrom.

In accordance with a method of flow restriction, an adjustable flow restrictor is provided. The adjustable flow restrictor includes a pathway defined by truncated internal threads of a nut and external threads of an adjustment screw installed into the nut. After determining a desired volumetric flow rate for a liquid, the liquid is flowed at a constant incoming pressure through the adjustable flow restrictor. The actual volumetric flow rate of the liquid exiting the adjustable flow restrictor is measured and then compared to the desired volumetric flow rate. The adjustment screw is adjusted relative to the nut in order to varying the pathway with respect to a length thereof. Adjusting the length of the pathway sets the actual volumetric flow rate of the liquid traversing the pathway for exit from the adjustable flow restrictor. The adjustment screw is adjusted relative to the nut until the actual volumetric flow rate equals the desired volumetric flow rate. Adjusting the adjustment screw relative to the nut to vary the length of the pathway includes retracting the adjustment screw relative to the nut to decrease the length of the pathway, resulting in a decrease in duration of liquid contact with the pathway and frictional energy losses of the liquid as the liquid traverses the pathway and a corresponding increase in the actual volumetric flow rate of the liquid delivered from the adjustable flow restrictor. Conversely, adjusting the adjustment screw relative to the nut to vary the length of the pathway includes progressing the adjustment screw relative to the nut to increase the length of the pathway, resulting in an increase in duration of liquid contact with the pathway and frictional energy losses of the liquid as the liquid traverses the pathway and a corresponding decrease in the actual volumetric flow rate of the liquid delivered from the adjustable flow restrictor.

It is therefore an object of the present invention to provide an adjustable flow restrictor capable of providing fine adjustments that allow precise volumetric flow rate settings.

It is another object of the present invention to provide an adjustable flow restrictor with a variable length pathway that facilitates regulation of a liquid traversing the pathway with respect to a volumetric flow rate thereof.

Still other objects, features, and advantages of the present invention will become evident to those of ordinary skill in the art in light of the following. Also, it should be understood that the scope of this invention is intended to be broad, and any combination of any subset of the features, elements, or steps described herein is part of the intended scope of the invention.

DETAILED DESCRIPTION OF THE PREFERRED EMBODIMENT

Figure 1:
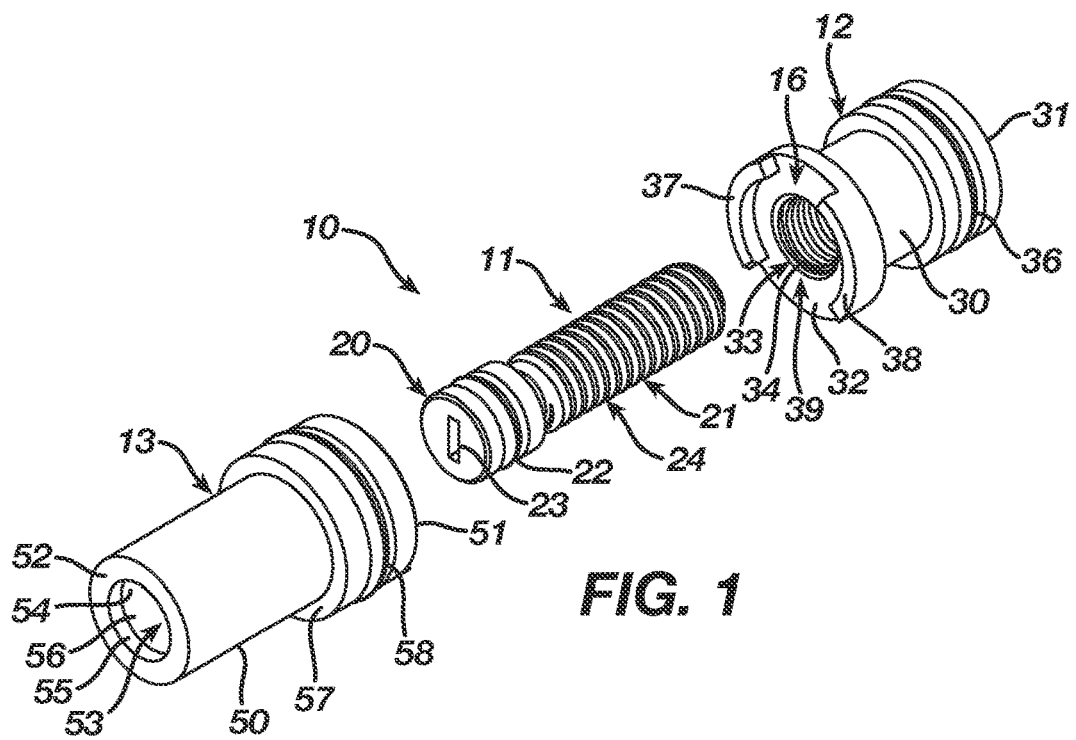
FIG. 1 is an exploded isometric view illustrating an adjustable flow restrictor according to a preferred embodiment of the present invention.
Figure 2:
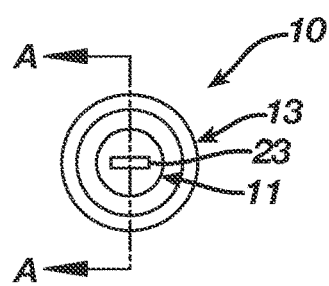
FIG. 2 is a front view illustrating the adjustable flow restrictor according to the preferred embodiment of the present invention.

As required, detailed embodiments of the present invention are disclosed herein; however, it is to be understood that the disclosed embodiments are merely exemplary of the invention, which may be embodied in various forms. Figures are not necessarily to scale, and some features may be exaggerated to show details of particular components or steps.

With reference to FIGS. 1-8, an adjustable flow restrictor 10 includes an adjustment screw 11, a nut 12, and a sleeve 13. The adjustment screw 11 installs into the nut 12 and integrates therewith in order to define therebetween a pathway 14 for a liquid to flow through the adjustable flow restrictor 10. The sleeve 13 fits over the adjustment screw 11 and mates with the nut 12 whereby the nut 12 and the sleeve 13 define a chamber 15 with an outlet 16. The pathway 14 communicates with the chamber 15 such that the pathway 14 conveys the liquid flowing therethrough into the chamber 15. The chamber 15 receives the liquid therein and then delivers the liquid from the adjustable flow restrictor 10 via the outlet 16. Adjustment of the adjustment screw 11 relative to the nut 12 varies the pathway 14 with respect to a length thereof resulting in the adjustable flow restrictor 10 providing therefrom specific volumetric flow rates.

Figure 3:
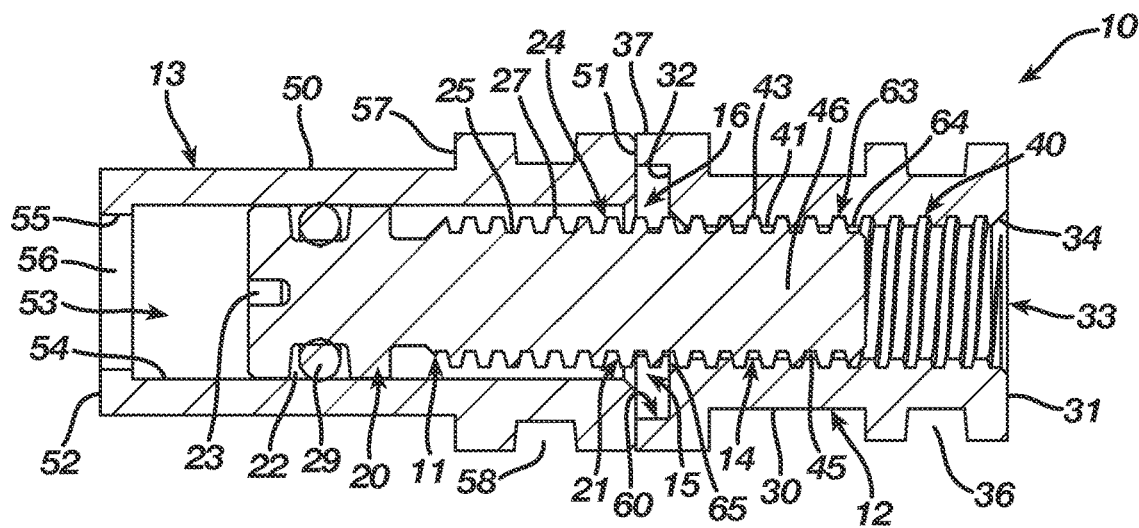
FIG. 3 is a cross-sectional view taken along lines A-A of FIG. 3A illustrating an intermediate flow setting for the adjustable flow restrictor according to the preferred embodiment of the present invention.
Figure 4A:
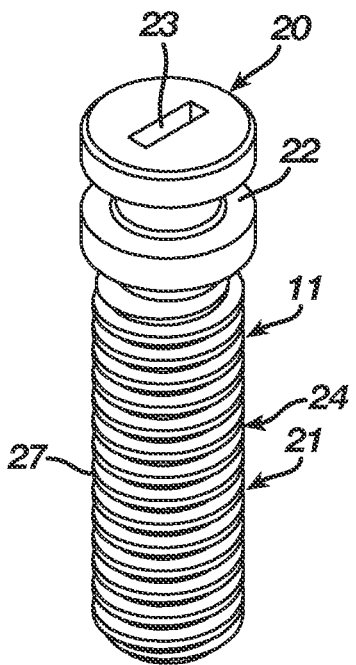
FIG. 4A is a top isometric view illustrating an adjustment screw for the adjustable flow restrictor according to the preferred embodiment of the present invention.
Figure 4B:
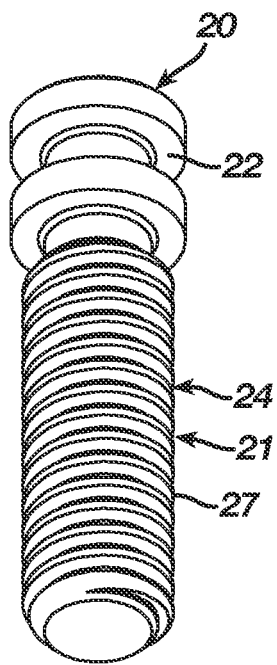
FIG. 4B is a bottom isometric view illustrating the adjustment screw for the adjustable flow restrictor according to the preferred embodiment of the present invention.
Figure 4C:
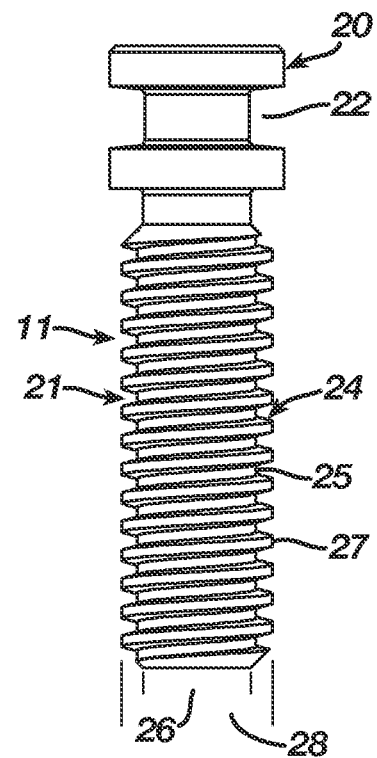
FIG. 4C is a side view illustrating the adjustment screw for the adjustable flow restrictor according to the preferred embodiment of the present invention.
Figure 4D:
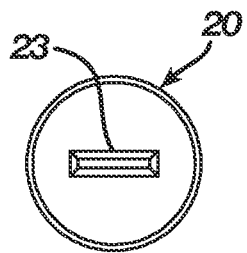
FIG. 4D is a top view illustrating the adjustment screw for the adjustable flow restrictor according to the preferred embodiment of the present invention.
Figure 4E:
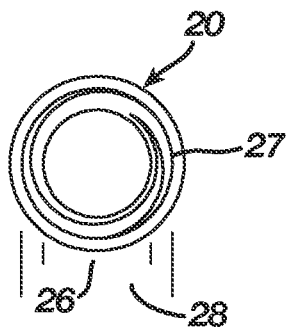
FIG. 4E is a bottom view illustrating the adjustment screw for the adjustable flow restrictor according to the preferred embodiment of the present invention.
Figure 5A:
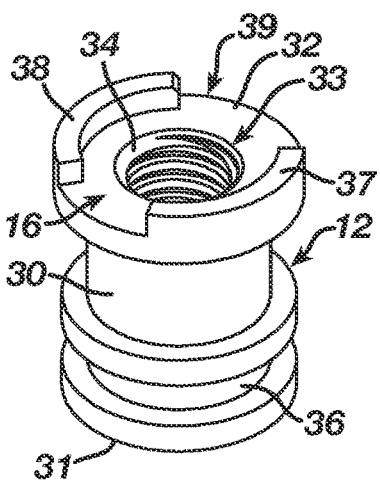
FIGS. 5A-5B are isometric views illustrating a nut at an outlet thereof for the adjustable flow restrictor according to the preferred embodiment of the present invention.
Figure 5B:
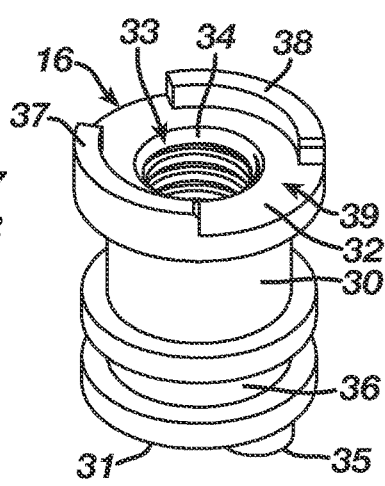
Figure 5C:
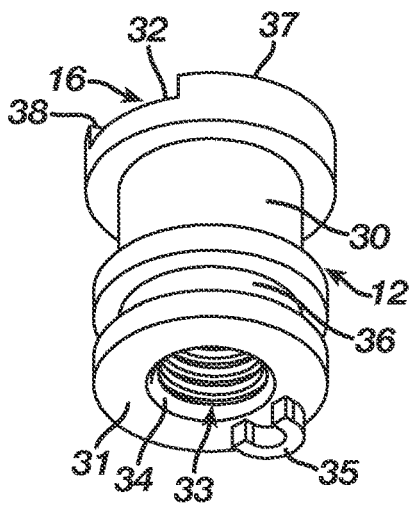
FIG. 5C is a bottom isometric view illustrating the nut at an inlet thereof for the adjustable flow restrictor according to the preferred embodiment of the present invention.
Figure 5D:
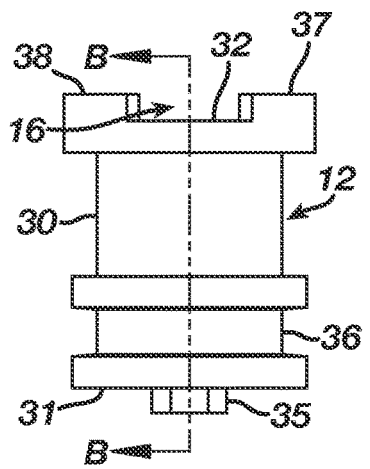
FIGS. 5D-5F are side views illustrating the nut for the adjustable flow restrictor according to the preferred embodiment of the present invention.
Figure 5E:
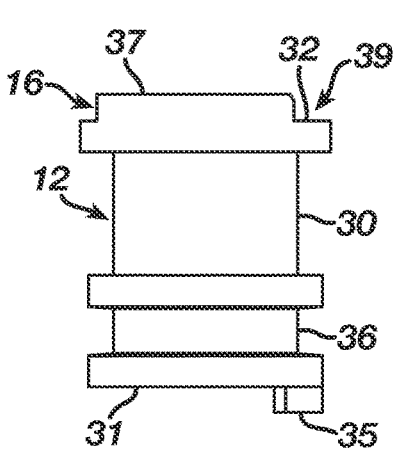
Figure 5F:
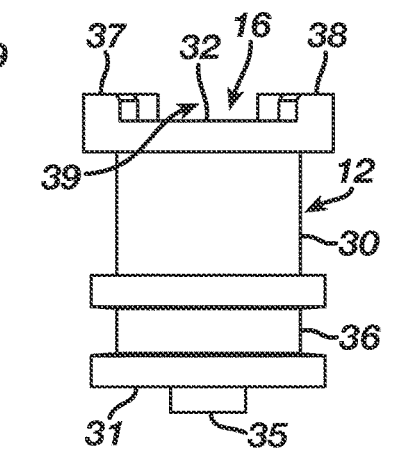
Figure 5G:
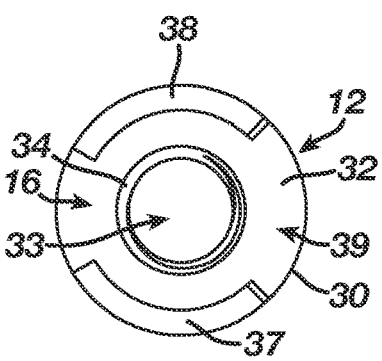
FIG. 5G is an elevation view illustrating the nut at the outlet thereof for the adjustable flow restrictor according to the preferred embodiment of the present invention.
Figure 5H:
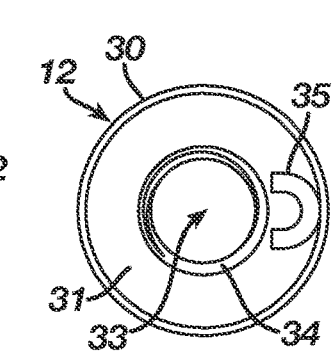
FIG. 5H is an elevation view illustrating the nut at the inlet thereof for the adjustable flow restrictor according to the preferred embodiment of the present invention.
Figure 5I:
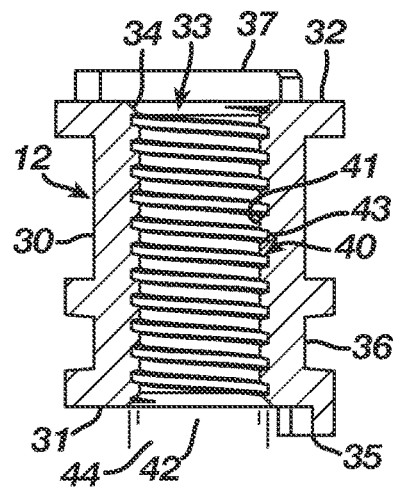
FIG. 5I is a cross-sectional view taken along lines B-B of FIG. 5D illustrating the nut for the adjustable flow restrictor according to the preferred embodiment of the present invention.
Figure 6A:
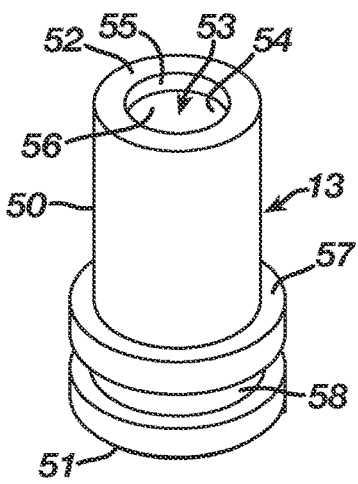
FIGS. 6A-6B are isometric views illustrating a sleeve at an inlet thereof for the adjustable flow restrictor according to the preferred embodiment of the present invention.
Figure 6B:
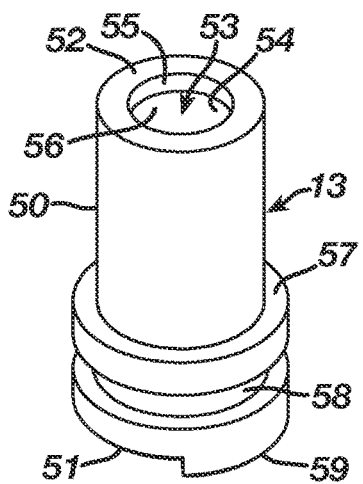
Figure 6C:
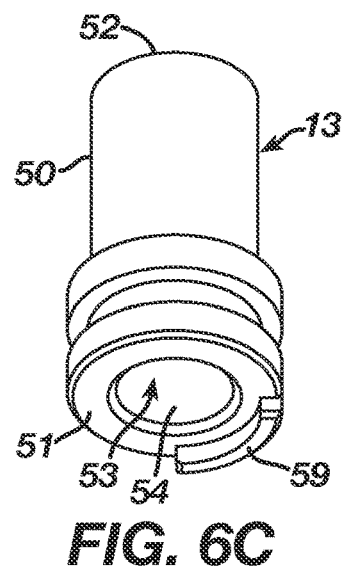
FIG. 6C is a bottom isometric view illustrating the sleeve at an outlet thereof for the adjustable flow restrictor according to the preferred embodiment of the present invention.
Figure 6D:
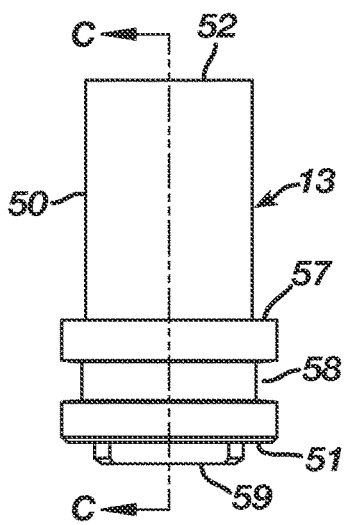
FIGS. 6D-6F are side views illustrating the sleeve for the adjustable flow restrictor according to the preferred embodiment of the present invention.
Figure 6E:
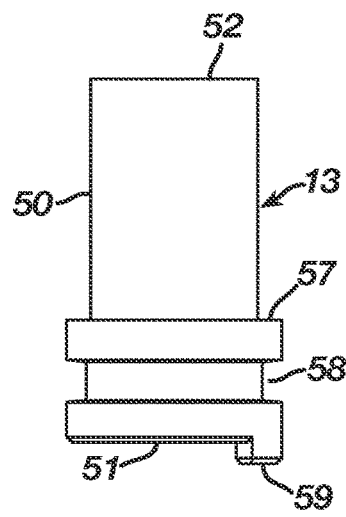
Figure 6F:
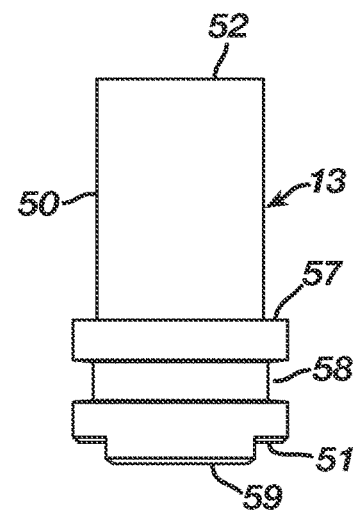
Figure 6G:
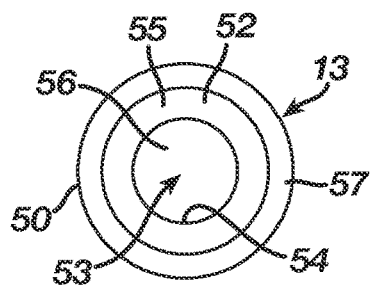
FIG. 6G is an elevation view illustrating the sleeve at the inlet thereof for the adjustable flow restrictor according to the preferred embodiment of the present invention.
Figure 6H:
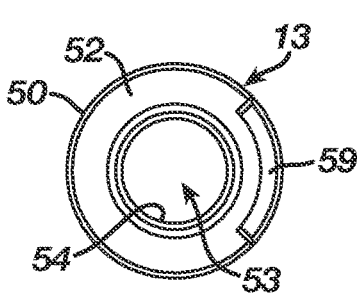
FIG. 6H is an elevation view illustrating the sleeve at the outlet thereof for the adjustable flow restrictor according to the preferred embodiment of the present invention.
Figure 6I:
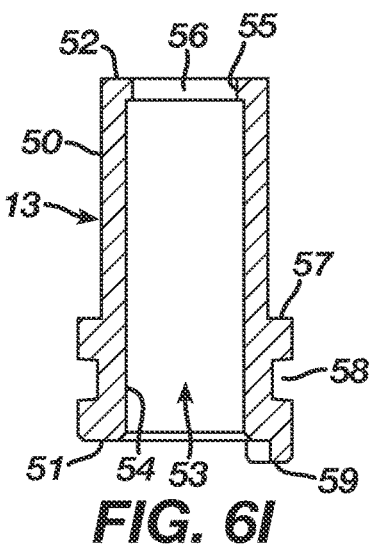
FIG. 6I is a cross-sectional view taken along lines C-C of FIG. 6D illustrating the sleeve for the adjustable flow restrictor according to the preferred embodiment of the present invention.
Figure 7:
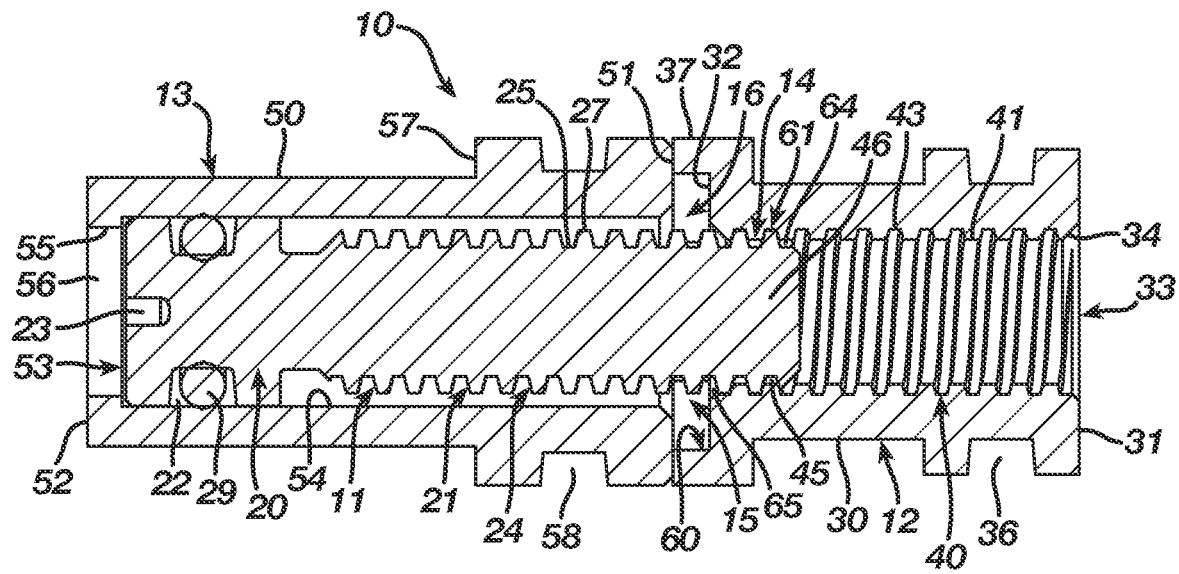
FIG. 7 is a cross-sectional view taken along lines A-A of FIG. 3A illustrating a maximum flow setting for the adjustable flow restrictor according to the preferred embodiment of the present invention.
Figure 8:
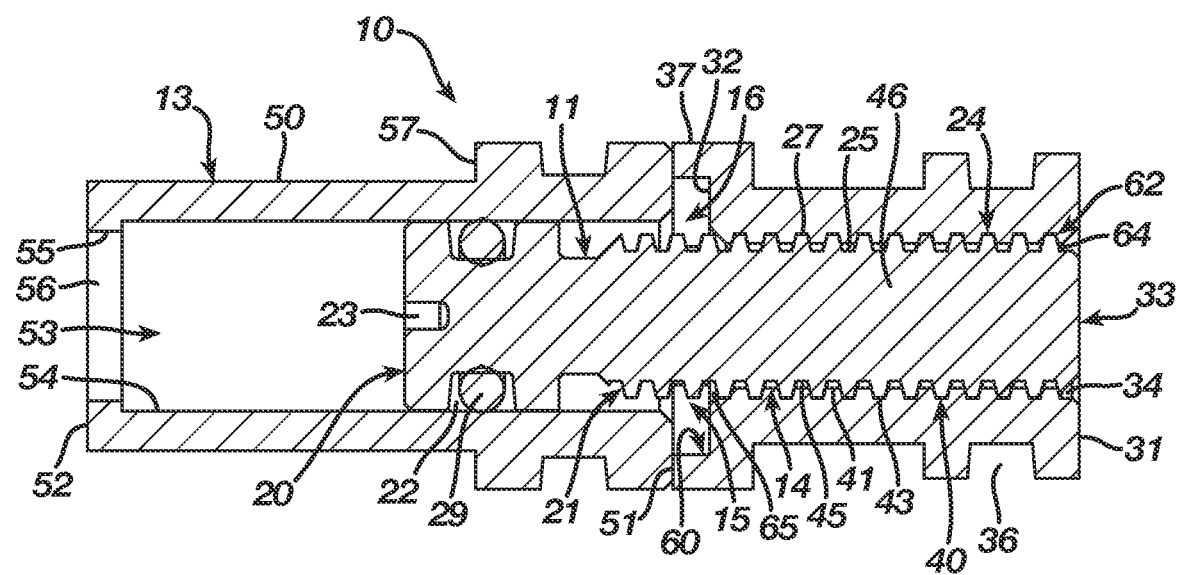
FIG. 8 is a cross-sectional view taken along lines A-A of FIG. 3A illustrating a minimum flow setting for the adjustable flow restrictor according to the preferred embodiment of the present invention.

Referring specifically to FIGS. 4A-4E, the adjustment screw 11 includes a head 20 and a shaft 21. The head 20 includes a groove 22 configured to receive therein a seal, such as for example an O-ring 29 as illustrated in FIGS. 3 and 7-8, that provides a liquid seal between the head 20 of the adjustment screw 11 and the sleeve 13 in order to seal the chamber 15 and prevent liquid therein from bypassing the head 20 and escaping the sleeve 13. The head 20 further includes a slot 23 at a top thereof configured to receive therein a tool, such as for example a screwdriver, used to adjust the adjustment screw 11 relative to the nut 12. The shaft 21 along a majority of the length thereof includes external threads 24 configured to facilitate an installation of the adjustment screw 11 within the nut 12. The external threads 24 in the preferred embodiment include roots 25 producing a minor diameter 26 and crests 27 producing a major diameter 28.

Referring specifically to FIGS. 5A-5I, the nut 12 includes a body 30 with a first or inlet end 31, a second or outlet end 32, and a passage 33 therethrough defined by an inner wall 34 of the nut 12. The nut 12 in the preferred embodiment includes a projection 35 extending from the first or inlet end 31 that provides an alignment feature used when incorporating the nut 12 and thus the adjustable flow restrictor 10 into a flow control device. The nut 12 in the body 30 includes a groove 36 configured to receive therein a seal, such as for example an O-ring, that provides a sealing feature used when incorporating the nut 12 and thus the adjustable flow restrictor 10 into a flow control device. The nut 12 includes raised walls 37 and 38 extending from the second or outlet end 32 that function in combination with the sleeve 13 to form the chamber 15. The raised walls 37 and 38 are spaced apart about the second or outlet end 32 in order to define the outlet 16 of the chamber 15 and a gap 39 across from the outlet 16 used during the mating of the sleeve 13 with the nut 12 to form the chamber 15. The raised walls 37 and 38 in the preferred embodiment form a key configured to orient the outlet 16 in a proper direction for an exit of liquid from the outlet 16.

The nut 12 in the inner wall 34 defining the passage 33 includes internal threads 40 having crests 41 producing a minor diameter 42 and roots 43 producing a major diameter 44. The internal threads 40 of the nut 12 and the external threads 24 of the adjustment screw 11 are complementary such that the adjustment screw 11 installs into the nut 12 and integrates therewith. Nevertheless, in the preferred embodiment, the internal threads 40 of the nut 12, as compared to a typical internally threaded nut, are truncated relative to the external threads 24 of the adjustment screw 11 in order to produce truncated internal threads 40. In accordance therewith, the truncated internal threads 40 are spaced apart from the external threads 24 to form a gap 45 therebetween, which, in the preferred embodiment presents a trapezoidal cross-sectional area between the truncated internal threads 40 and the external threads 24. The spacing apart of the nut 12 at the truncated internal threads 40 and the adjustment screw 11 at the external threads 24 to form the gap 45 defines the pathway 14. The pathway 14 in the preferred embodiment, accordingly, comprises a helical flow path located between the truncated internal threads 40 for the nut 12 and the external threads 24 for the adjustment screw 11 that travels about the adjustment screw 11 along a segment 46 thereof installed within the nut 12. As will be described more fully herein, an insertion of the adjustment screw 11 into the nut 12 varies the pathway 14 with respect to increasing a length thereof resulting in the adjustable flow restrictor 10 providing therefrom a lower volumetric flow rate. Conversely, a retraction of the adjustment screw 11 from the nut 12 varies the pathway 14 with respect to decreasing a length thereof resulting in the adjustable flow restrictor 10 providing therefrom a higher volumetric flow rate.

In the preferred embodiment, the crests 27 of the external threads 24 for the adjustment screw 11 and the roots 43 of the internal threads 40 for the nut 12 are formed whereby the major diameter 28 of the adjustment screw 11 and the major diameter 44 of the nut 12 are substantially, completely identical, resulting in the crests 27 fitting substantially, completely within the roots 43. While the crests 27 fit substantially, completely within the roots 43, the crests 41 of the internal threads 40 and the roots 25 of the external threads 24 in the preferred embodiment are formed whereby the crests 41 are truncated relative to the roots 25 in order to produce truncated crests 41 that result in the minor diameter 42 of the nut 12 being greater than the minor diameter 26 of the adjustment screw 11. In accordance therewith, the truncated crests 41 of the internal threads 40 are spaced apart from the roots 25 of the external threads 24 to form the gap 45 therebetween, which, in the preferred embodiment presents the trapezoidal cross-sectional area between the truncated crests 41 and the roots 25. The spacing apart of the nut 12 at the truncated crests 41 of the internal threads 40 and the adjustment screw 11 at the roots 25 of the external threads 24 to form the gap defines the pathway 14. The pathway 14 in the preferred embodiment, accordingly, comprises the helical flow path located between the truncated crests 41 of the internal threads 40 for the nut 12 and the roots 25 of the external threads 24 for the adjustment screw 11 that travels about the adjustment screw 11 along the segment 46 thereof installed within the nut 12. Although the preferred embodiment utilizes the truncated crests 41 to create the pathway 14, one of ordinary skill in the art will recognize the crests 27 of the external threads 24 for the adjustment screw 11 may be truncated relative to the roots 43 of the internal threads 40 for the nut 12 in order to produce truncated crests 27 that form the gap 45 defining the pathway 14.

Referring specifically to FIGS. 6A-6I, the sleeve 13 includes a body 50 with a first or inlet end 51, a second or adjustment end 52, and a passage 53 therethrough defined by an inner wall 54 of the sleeve 13. The first or inlet end 51 and the passage 53 in the preferred embodiment are configured to receive therein the adjustment screw 11 and in particular the head 20 thereof. The head 20 and the O-ring 29 disposed in the groove 22 contact the inner wall 54 defining the passage 53 in order to provide a liquid seal between the head 20 of the adjustment screw 11 and the sleeve 13 that seals the chamber 15 and prevents liquid therein from bypassing the head 20 and escaping the sleeve 13. The sleeve 13 at the second or adjustment end 52 includes a lip 55 projecting therefrom that stops the adjustment screw 11 at the head 20 from exiting the sleeve 13 at the second or adjustment end 52. While the lip 55 retains the adjustment screw 11 within the sleeve 13, the lip 55 defines an opening 56 sized to allow insertion therethrough of a tool, such as for example a screwdriver, used to engage the slot 23 for adjustment of the adjustment screw 11 relative to the nut 12. The sleeve 13 in the preferred embodiment includes a raised surface 57 extending from the body 50 that provides a securing feature used to fasten the sleeve 13 and thus the adjustable flow restrictor 10 when incorporating the sleeve 13 and thus the adjustable flow restrictor 10 into a flow control device. The sleeve 13 in the body 30 includes a groove 58 configured to receive therein a seal, such as for example an O-ring, that provides a sealing feature used when incorporating the sleeve 13 and thus the adjustable flow restrictor 10 into a flow control device. The sleeve 13 includes a raised wall 59 extending from the first or inlet end 51 that functions in combination with the raised walls 37 and 38 of the nut 12 to form the chamber 15. During mating of the sleeve 13 with the nut 12 whereby the sleeve 13 at the first or inlet end 51 engages with the nut 12 at the second or outlet end 32, the raised wall 59 inserts into the gap 39 between the raised walls 37 and 38 such that the raised walls 37, 38, and 59 define a chamber wall 60 of the chamber 15 that directs liquid received into the chamber 15 from the pathway 14 toward the outlet 16 for delivery from the outlet 16 and thus the adjustable flow restrictor 10. While the nut 12 and the sleeve 13 in the preferred embodiment are separate pieces with the sleeve 13 including the lip 55 to prevent accidental removal of the adjustment screw 11 from the sleeve 13, one of ordinary skill in the art will recognize the nut 12 and the sleeve 13 may be manufactured as a single piece without the lip 55.

With reference to FIGS. 1-3 and 7-8, the adjustable flow restrictor 10 assembles as follows. The adjustment screw 11 at the shaft 21 inserts into the nut 12 from the second or outlet end 32 and installs within the nut 12 via the passage 33. The internal threads 40 of the nut 12 receive therein the external threads 24 of the adjustment screw 11 whereby the truncated internal threads 40 remain spaced apart from the external threads 24 in order to form the gap 45 therebetween that defines the pathway 14. More particularly, the internal threads 40 of the nut 12 receive therein the external threads 24 of the adjustment screw 11 in that the crests 27 of the external threads 24 engage the roots 43 of the internal threads 40 whereas the truncated crests 41 of the internal threads 40 engage the roots 25 of the external threads 24 while remaining spaced apart therefrom to form the gap 45 therebetween that defines the pathway 14. The adjustment screw 11 at the shaft 21 thereof, which will be described more fully herein, installs within the nut 12 at the passage 33 thereof: 1) at least a minimum distance 61 required for engagement of the external threads 24 with the internal threads 40 as illustrated in FIG. 7 that produces a minimum helical flow path for the pathway 14 and resulting maximum volumetric flow rate from the adjustable flow restrictor 10; 2) a maximum distance 62 in which the external threads 24 fully engage the internal threads 40 as illustrated in FIG. 8 that produces a maximum helical flow path for the pathway 14 and resulting minimum volumetric flow rate from the adjustable flow restrictor 10; and 3) intermediate distances between the minimum distance 61 and the maximum distance 62 in which the external threads 24 partially engage the internal threads 40, such as, for example, the intermediate distance 63 as illustrated in FIG. 3 that produces an intermediate helical flow path for the pathway 14 and resulting intermediate volumetric flow rate from the adjustable flow restrictor 10. The shaft 21 of the adjustment screw 11 in the preferred embodiment includes a length at least substantially equal to an overall length of the nut 12 including the raised walls 37 and 38 extending from the second or outlet end 32 in order for the shaft 21 to fill the passage 33 and achieve the maximum distance 62 while the head 20 of the adjustment screw 11 remains spaced apart from the chamber 15. Nevertheless, the length of the shaft 21 may be greater than the overall length of the nut 12 on the basis a flow control device incorporating the adjustable flow restrictor 10 therein will prevent the shaft 21 from exiting the nut 12 from the first or inlet end 31.

The sleeve 13 at the first or inlet end 51 fits over the adjustment screw 11 at the head 20 thereof, including the O-ring 29, and receives therein the adjustment screw 11 at both the head 20 and the shaft 21 thereof until the sleeve 13 at the first or inlet end 51 engages with the nut 12 from the second or outlet end 32. The sleeve 13 aligns with the nut 12 such that the raised wall 59 inserts into the gap 39 between the raised walls 37 and 38 and abuts the second or outlet end 32 of the nut 12 while the raised walls 37 and 38 abut the first or inlet end 51 of the sleeve 13. The integration of the raised walls 37, 38, and 59 forms the chamber wall 60 about the chamber 15 that directs liquid received into the chamber 15 from the pathway 14 toward the outlet 16 for delivery from the outlet 16 and thus the adjustable flow restrictor 10. The sleeve 13 in the preferred embodiment includes a length that permits movement of the adjustment screw 11 between the minimum distance 61, which, as illustrated in FIG. 7, consists of the head 20 of the adjustment screw 11 being located within the passage 53 of the sleeve 13 adjacent the lip 55, and the maximum distance 62, which, as illustrated in FIG. 8, consists of the shaft 21 of the adjustment screw 11 installed fully within the nut 12 while the head 20 thereof remains spaced apart from the chamber 15.

Referring specifically to FIGS. 3 and 7-8, the adjustable flow restrictor 10 operates as follows in order to provide adjustable volumetric flow rates therefrom. A liquid, such as for example a beverage concentrate, a medicine, or the like, delivered to the nut 13 enters the nut 13 at the first or inlet end 31 thereof. The shaft 21 of the adjustment screw 11 at the segment 46 thereof installed within the nut 12 blocks the flow of the liquid through the nut 12 except for the pathway 14 which receives the liquid therein at an inlet 64 thereof. The liquid enters the pathway 14 and travels therethrough along the segment 46 of the shaft 21 for the adjustment screw 11 installed within the nut 12 according to the helical flow path created between the truncated internal threads 40 for the nut 12 and the external threads 24 for the adjustment screw 11. More particularly, the liquid travels through the pathway 14 according to the helical flow path formed between the minor diameter 42 of the nut 12 created by the truncated crests 41 of the internal threads 40 and the minor diameter 26 of the adjustment screw 11 created by the roots 25 of the external threads 24. After traveling through the pathway 14, the liquid exits the pathway 14 and enters the chamber 15 via an outlet 65 of the pathway 14 communicating with the chamber 15, whereupon the liquid using the outlet 16 flows from the chamber 15 and thus the adjustable flow restrictor 10.

The adjustment screw 11 being adjustable relative to the nut 12 in order to vary the length of the pathway 14 provides the adjustable flow restrictor 10 with the capability to receive therein a liquid selected from various liquid types, such as, for example a beverage concentrate, a medicine, or the like, which have differing viscosities and are supplied to the adjustable flow restrictor 10 at the first or inlet end 31 over a range of inlet pressures, and then to compensate for the liquid with respect to the liquid type, the liquid viscosity, and the liquid inlet pressure such that the adjustable flow restrictor 10 delivers the liquid therefrom at a desired volumetric flow rate. Varying the length of the pathway 14 allows the adjustable flow restrictor 10 to adjust the volumetric flow rate of the liquid delivered therefrom because, in the preferred embodiment, the volumetric flow rate of the liquid depends upon the duration of liquid contact with the pathway 14 and the corresponding frictional energy losses experienced by the liquid due to the contact thereof with the pathway 14 as the liquid traverses the pathway 14. More particularly, the volumetric flow rate of the liquid is inversely proportional to the duration of liquid contact with the pathway 14 and the frictional energy losses of the liquid resulting from the contact of the liquid with the pathway 14 as the liquid moves through the pathway 14. In accordance therewith, adjusting the adjustment screw 11 to retract relative to the nut 12 decreases the length of the pathway 14 and thus the duration of liquid contact with the pathway 14 in that the number of turns in the helical flow path between the internal threads 40 of the nut 12 and the external threads 24 of the adjustment screw 11 decreases, resulting in a decrease in the frictional energy losses experienced by the liquid as the liquid traverses the pathway 14 and a corresponding increase in the volumetric flow rate of the liquid delivered from the adjustable flow restrictor 10. FIG. 7 illustrates the external threads 24 of the adjustment screw 11 engaged with the internal threads 40 of the nut 12 at the minimum distance 61 whereby the number of turns in the helical flow path for the pathway 14 is at a minimum, resulting in the minimum duration of liquid contact with the pathway 14 and frictional energy losses of the liquid as the liquid traverses the pathway 14 and the corresponding maximum volumetric flow rate from the adjustable flow restrictor 10. Conversely, adjusting the adjustment screw 11 to progress into the nut 12 increases the length of the pathway 14 and thus the duration of liquid contact with the pathway 14 in that the number of turns in the helical flow path between the internal threads 40 of the nut 12 and the external threads 24 of the adjustment screw 11 increases, resulting in an increase in the frictional energy losses experienced by the liquid as the liquid traverses the pathway 14 and a corresponding decrease in the volumetric flow rate of the liquid delivered from the adjustable flow restrictor 10. FIG. 8 illustrates the external threads 24 of the adjustment screw 11 engaged with the internal threads 40 of the nut 12 at the maximum distance 62 whereby the number of turns in the helical flow path for the pathway 14 is at a maximum, resulting in the maximum duration of liquid contact with the pathway 14 and frictional energy losses of the liquid as the liquid traverses the pathway 14 and the corresponding minimum volumetric flow rate from the adjustable flow restrictor 10. FIG. 3 illustrates an intermediate distance between the minimum distance 61 and the maximum distance 62 in which the external threads 24 of the adjustment screw 11 partially engage with the internal threads 40 of the nut 12 at the intermediate distance 63 whereby the number of turns in the helical flow path for the pathway 14 is intermediate, resulting in an intermediate duration of liquid contact with the pathway 14 and frictional energy losses of the liquid as the liquid traverses the pathway 14 and the corresponding intermediate volumetric flow rate from the adjustable flow restrictor 10.

After determining a desired volumetric flow rate and conveying a liquid to the adjustable flow restrictor 10 at a constant incoming pressure, the adjustment screw 11, while measurements of actual volumetric flow rate are made, is progressed into the nut 12 or retracted relative to the nut 12 until the pathway 14 achieves a length yielding a duration of liquid contact with the pathway 14 and a corresponding frictional energy loss experienced by the liquid as the liquid traverses the pathway 14 that produces an actual volumetric flow rate equal to the desired volumetric flow rate. The adjustable flow restrictor 10, accordingly, receives therein a liquid selected from a wide range of liquid types and liquid viscosities and supplied over a wide range of liquid inlet pressures and then delivers therefrom the liquid at a desired volumetric flow rate because the adjustable length of the pathway 14 offers fine adjustments that compensate for the liquid flowing therethrough with respect to the liquid type, the liquid viscosity, and the liquid inlet pressure. One of ordinary skill in the art will understand the adjustable flow restrictor 10 is scalable to accommodate a wide range of liquids in a wide range of industries and further the range of volumetric flow rates achievable for a defined pressure range is dependent upon the engaged threaded length of the internal and external threads, the pitch of the internal and external threads, the internal thread minor diameter, the external thread minor diameter, and the angle of the internal and external threads.

Figure 9A:
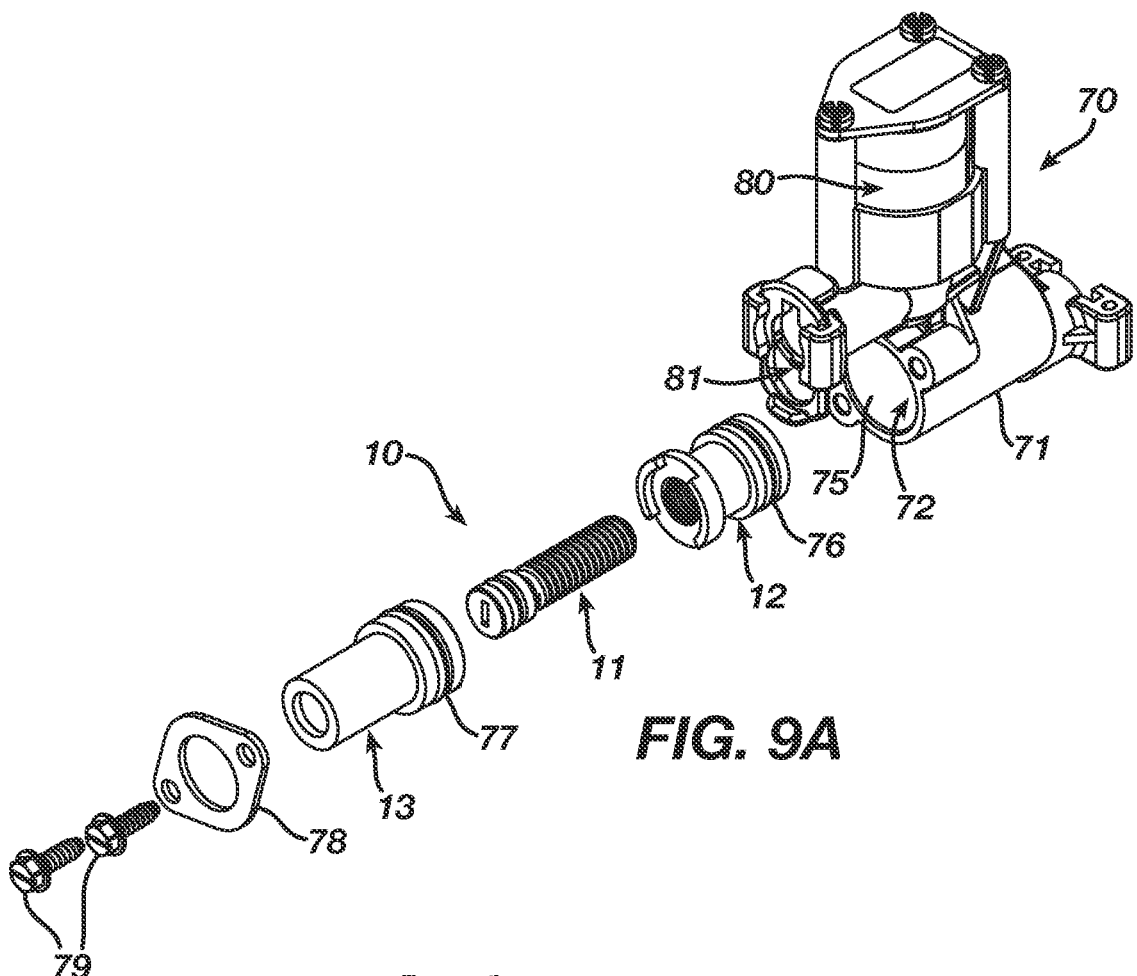
FIG. 9A is an exploded isometric view illustrating an example flow control device incorporating therein the adjustable flow restrictor according to the preferred embodiment of the present invention.
Figure 9B:
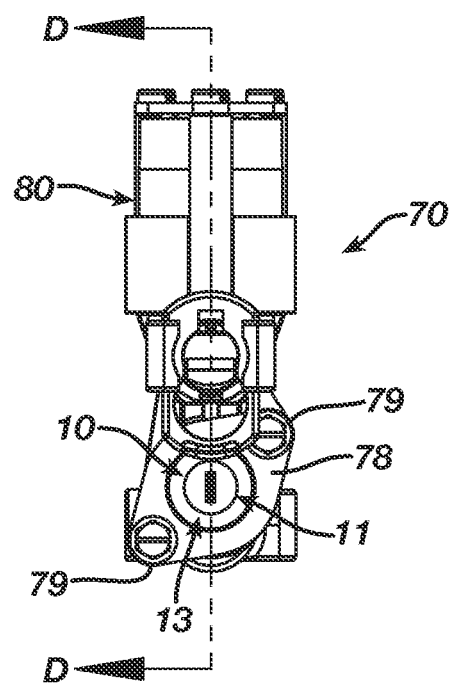
FIG. 9B is a front view illustrating the example flow control device incorporating therein the adjustable flow restrictor according to the preferred embodiment of the present invention.
Figure 9C:
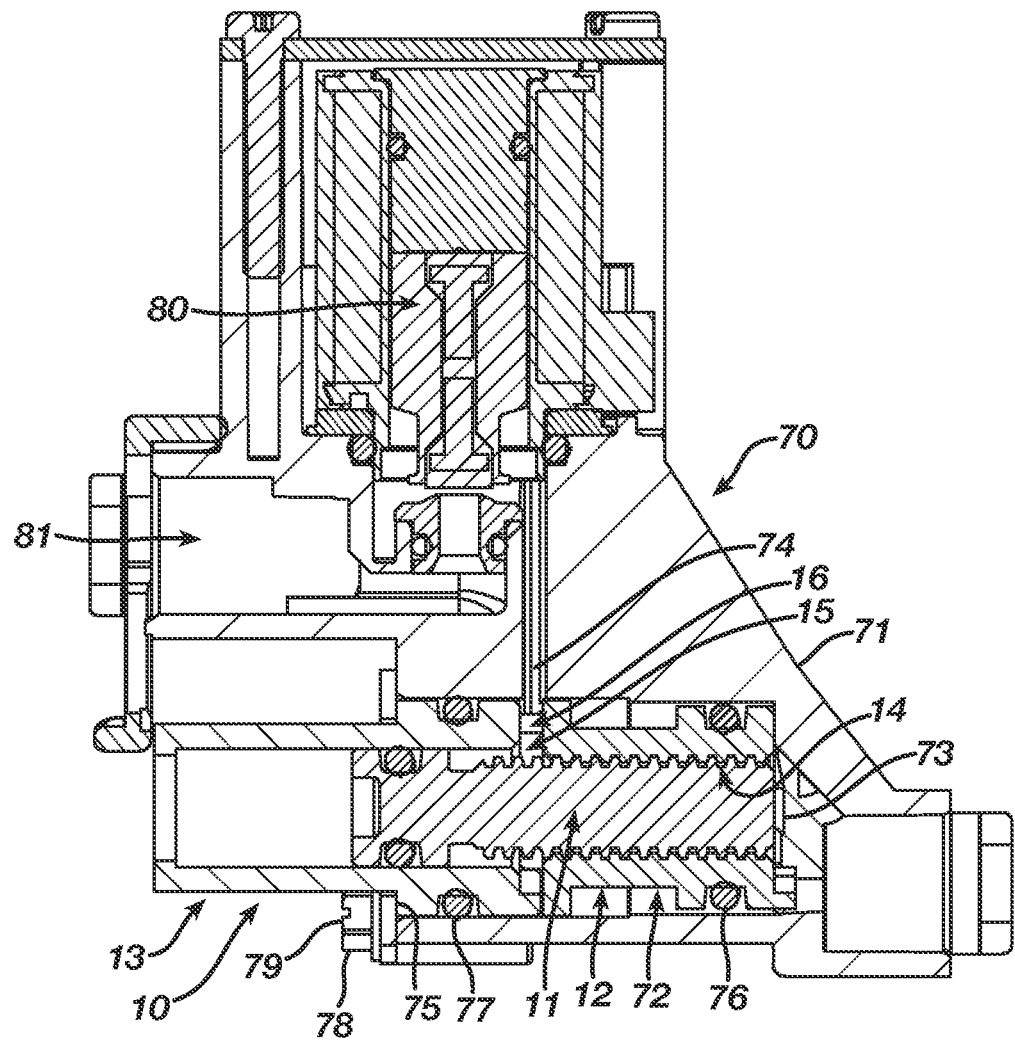
FIG. 9C is a cross-sectional view taken along lines D-D of FIG. 8B illustrating the example flow control device incorporating therein the adjustable flow restrictor according to the preferred embodiment of the present invention.

FIGS. 9A-9C illustrate a flow control device 70, which, more particularly, is a flow control valve, presented herein as an example device that may incorporate therein the adjustable flow restrictor 10 of the preferred embodiment in order to deliver a precise amount of liquid therefrom. The flow control device 70 includes a housing 71 defining a chamber 72 configured to incorporate therein the adjustable flow restrictor 10. The chamber 72 includes a liquid inlet 73, a liquid outlet passage 74, and an opening 75 configured to receive the adjustable flow restrictor 10 therethrough during incorporation of the adjustable flow restrictor 10 into the flow control device 70. The chamber 72 includes a diameter sized to receive therein the nut 12 and the sleeve 13 whereby a frictional engagement of the nut 12 including an O-ring 76 and the sleeve 13 including an O-ring 77 with the chamber 72 produces respective fluid seals that prevent liquid from escaping the chamber 72. The chamber 72 includes a length sufficient for the nut 12 to fit completely therein while the sleeve 13 fits partially therein such that the sleeve 13 at the raised surface 57 resides at the opening 75 of the chamber 72.

When incorporating the adjustable flow restrictor 10 into the flow control device 70, the nut 12 inserts into the chamber 72 until the nut 12 at the first or inlet end 31 resides adjacent the liquid inlet 73 of the chamber 72. The adjustment screw 11 may be previously installed in the nut 12 or installed after insertion of the nut 12 into the chamber 72. The sleeve 13 fits over the adjustment screw 11 and inserts into the chamber 72 until the sleeve 13 mates with the nut 12 to define the chamber 15 while residing adjacent the opening 75. After installation of the sleeve 13, a retaining plate 78 fit over the sleeve 13 and moved into abutting relationship with the raised surface 57 secures with the housing 71 at the opening 75 using suitable means such as screws 79 in order to retain the sleeve 13 and thus the adjustable flow restrictor 10 within the flow control device 70. The liquid outlet passage 74 from the chamber 72 is located within the housing 71 of the flow control device 70 to align with the outlet 16 from the chamber 15 of the adjustable flow restrictor 10 once the adjustable flow restrictor 10 is installed and then retained within the housing 71.

While a flow control device such as the flow control device 70 minimally includes the housing 71 defining the chamber 72 with the liquid inlet 73 for inletting a liquid to the adjustable flow restrictor 10 and the liquid outlet passage 74 for delivering the liquid from the outlet 16 of the adjustable flow restrictor 10 and thus the housing 71 of the flow control device 70, the flow control device 70 includes an on/off flow control 80 in the form of a solenoid operated valve disposed in an outlet channel 81 connected with the liquid outlet passage 74. Upon activation of the on/off flow control 80, a liquid via the liquid inlet 73 enters the adjustable flow restrictor 10 at the first or inlet end 31 of the nut 12. The liquid flows through the pathway 14, which has been adjusted according to length in order to produce a desired volumetric flow rate for the liquid, and into the chamber 15 for exit into the liquid outlet passage 74 from the adjustable flow restrictor 10 via the outlet 16. The liquid, which is flowing at the desired volumetric flow rate, flows through the liquid outlet passage 74 and enters the outlet channel 81, where the liquid flows past the on/off flow control 80 for exit from the housing 71 using the outlet channel 81. The liquid exiting from the housing 71 using the outlet channel 81 is delivered at the desired volumetric flow rate for use in a drink, a medical treatment, or the like.

Although the present invention has been described in terms of the foregoing preferred embodiment, such description has been for exemplary purposes only and, as will be apparent to those of ordinary skill in the art, many alternatives, equivalents, and variations of varying degrees will fall within the scope of the present invention. That scope, accordingly, is not to be limited in any respect by the foregoing detailed description; rather, it is defined only by the claims that follow.

What is claimed is:

1. An adjustable flow restrictor, comprising:
a nut including a first end adapted to receive a liquid therein and a second end;
an adjustment screw being adapted to install into the nut from the second end thereof, the adjustment screw and the nut being configured to define a pathway therebetween, whereby adjustment of the adjustment screw relative to the nut varies the pathway with respect to a length thereof;
a sleeve including a first end and a second end, the sleeve being adapted at the first end thereof to fit over the adjustment screw and mate with the nut at the second end thereof, whereby the nut and the sleeve define a chamber with an outlet;
the nut including a first raised wall and a second raised wall extending from the second end thereof, the first raised wall and the second raised wall being spaced apart about the second end to define the outlet of the chamber and a gap across from the outlet;
the sleeve including a raised wall extending from the first end, whereby, during mating of the sleeve at the first end thereof with the nut at the second end thereof, the raised wall of the sleeve inserts into the gap between the first and second raised walls of the nut such that the raised wall of the sleeve, the first raised wall of the nut, and the second raised wall of the nut define a chamber wall of the chamber that directs liquid received into the chamber from the pathway toward the outlet for delivery therefrom; and
the pathway being adapted to receive therein a liquid conveyed to the nut at the first end thereof and communicate the liquid to the chamber for exit therefrom via the outlet, whereby adjusting the length of the pathway regulates the liquid traversing the pathway with respect to volumetric flow rate such that the liquid exiting the outlet flows therefrom at a desired volumetric flow rate.

2. The adjustable flow restrictor of claim 1, wherein:
adjusting the adjustment screw relative to the nut to decrease the length of the pathway results in an increase in the volumetric flow rate of the liquid delivered from the outlet; and
adjusting the adjustment screw relative to the nut to increase the length of the pathway results in a decrease in the volumetric flow rate of the liquid delivered from the outlet.

3. The adjustable flow restrictor of claim 1, wherein:
the adjustment screw comprises a head and a shaft extending from the head, whereby the shaft includes external threads;
the nut defines a passage therethrough including truncated internal threads; and the adjustment screw at the shaft thereof being adapted to install into the nut from the second end thereof, whereby the truncated internal threads of the nut and the external threads of the shaft for the adjustment screw are spaced apart to form the pathway.

4. The adjustable flow restrictor of claim 3, wherein the pathway comprises a helical flow path located between the truncated internal threads of the nut and the external threads of the shaft for the adjustment screw that travels about the shaft of the adjustment screw along a segment thereof installed within the nut.

5. The adjustable flow restrictor of claim 4, wherein:
adjusting the adjustment screw to retract the shaft thereof relative to the nut decreases the length of the pathway through decreasing the helical flow path between the truncated internal threads of the nut and the external threads of the shaft for the adjustment screw with respect to a number of turns therein, resulting in a decrease in duration of liquid contact with the pathway and frictional energy losses of the liquid as the liquid traverses the pathway and a corresponding increase in the volumetric flow rate of the liquid delivered from the outlet; and
adjusting the adjustment screw to progress the shaft thereof into the nut increases the length of the pathway through increasing the helical flow path between the truncated internal threads of the nut and the external threads of the shaft for the adjustment screw with respect to a number of turns therein, resulting in an increase in duration of liquid contact with the pathway and frictional energy losses of the liquid as the liquid traverses the pathway and a corresponding decrease in the volumetric flow rate of the liquid delivered from the outlet.

6. The adjustable flow restrictor of claim 1, wherein:
the adjustment screw comprises a head and a shaft extending from the head, whereby the shaft includes external threads having roots and crests;
the nut defines a passage therethrough including internal threads having roots and truncated crests; and
the adjustment screw at the shaft thereof being adapted to install into the nut from the second end thereof, whereby the crests of the external threads of the shaft for the adjustment screw fit within the roots of the internal threads of the nut, further whereby the truncated crests of the internal threads of the nut and the roots of the external threads of the shaft for the adjustment screw are spaced apart to form the pathway.

7. The adjustable flow restrictor of claim 6, wherein the pathway comprises a helical flow path located between the truncated crests of the internal threads of the nut and the roots of the external threads of the shaft for the adjustment screw that travels about the adjustment screw along a segment thereof installed within the nut.

8. The adjustable flow restrictor of claim 7, wherein:
adjusting the adjustment screw to retract the shaft thereof relative to the nut decreases the length of the pathway through decreasing the helical flow path between the truncated crests of the internal threads of the nut and the roots of the external threads of the shaft for the adjustment screw with respect to a number of turns therein, resulting in a decrease in duration of liquid contact with the pathway and frictional energy losses of the liquid as the liquid traverses the pathway and a corresponding increase in the volumetric flow rate of the liquid delivered from the outlet; and
adjusting the adjustment screw to progress the shaft thereof into the nut increases the length of the pathway through increasing the helical flow path between the truncated crests of the internal threads of the nut and the roots of the external threads of the shaft for the adjustment screw with respect to a number of turns therein, resulting in an increase in duration of liquid contact with the pathway and frictional energy losses of the liquid as the liquid traverses the pathway and a corresponding decrease in the volumetric flow rate of the liquid delivered from the outlet.

9. The adjustable flow restrictor of claim 1, wherein:
the external threads of the shaft for the adjustment screw include roots and crests; and
the truncated internal threads of the nut include roots and crests truncated to form truncated crests that produce the truncated internal threads, whereby the crests of the external threads of the shaft for the adjustment screw fit within the roots of the internal threads of the nut, further whereby the truncated crests of the truncated internal threads of the nut and the roots of the external threads of the shaft for the adjustment screw are spaced apart to form the pathway.

10. The adjustable flow restrictor of claim 9, wherein the pathway comprises a helical flow path located between the truncated crests of the truncated internal threads of the nut and the roots of the external threads of the shaft for the adjustment screw that travels about the adjustment screw along a segment thereof installed within the nut.

11. The adjustable flow restrictor of claim 10, wherein:
adjusting the adjustment screw to retract the shaft thereof relative to the nut decreases the length of the pathway through decreasing the helical flow path between the truncated crests of the truncated internal threads of the nut and the roots of the external threads of the shaft for the adjustment screw with respect to a number of turns therein, resulting in a decrease in duration of liquid contact with the pathway and frictional energy losses of the liquid as the liquid traverses the pathway and a corresponding increase in the volumetric flow rate of the liquid delivered from the outlet; and
adjusting the adjustment screw to progress the shaft thereof into the nut increases the length of the pathway through increasing the helical flow path between the truncated crests of the truncated internal threads of the nut and the roots of the external threads of the shaft for the adjustment screw with respect to a number of turns therein, resulting in an increase in duration of liquid contact with the pathway and frictional energy losses of the liquid as the liquid traverses the pathway and a corresponding decrease in the volumetric flow rate of the liquid delivered from the outlet.

12. An adjustable flow restrictor, comprising:
a nut including a first end adapted to receive a liquid therein and a second end, the nut defining a passage therethrough including truncated internal threads;
an adjustment screw comprising a head and a shaft extending from the head, whereby the shaft includes external threads, the adjustment screw at the shaft thereof being adapted to install into the nut from the second end thereof such that the truncated internal threads of the nut and the external threads of the shaft for the adjustment screw are spaced apart to define a pathway therebetween, whereby adjustment of the adjustment screw relative to the nut varies the pathway with respect to a length thereof;

a sleeve including a first end and a second end, the sleeve being adapted at the first end thereof to fit over the adjustment screw and mate with the nut at the second end thereof, whereby the nut and the sleeve define a chamber with an outlet;

the nut including a first raised wall and a second raised wall extending from the second end thereof, the first raised wall and the second raised wall being spaced apart about the second end to define the outlet of the chamber and a gap across from the outlet;

the sleeve including a raised wall extending from the first end, whereby, during mating of the sleeve at the first end thereof with the nut at the second end thereof, the raised wall of the sleeve inserts into the gap between the first and second raised walls of the nut such that the raised wall of the sleeve, the first raised wall of the nut, and the second raised wall of the nut define a chamber wall of the chamber that directs liquid received into the chamber from the pathway toward the outlet for delivery therefrom; and the pathway being adapted to receive therein a liquid conveyed to the nut at the first end thereof and communicate the liquid to the chamber for exit therefrom via the outlet, whereby adjusting the length of the pathway regulates the liquid traversing the pathway with respect to volumetric flow rate such that the liquid exiting the outlet flows therefrom at a desired volumetric flow rate.

13. The adjustable flow restrictor of claim 12, wherein:
adjusting the adjustment screw relative to the nut to decrease the length of the pathway results in an increase in the volumetric flow rate of the liquid delivered from the outlet; and
adjusting the adjustment screw relative to the nut to increase the length of the pathway results in a decrease in the volumetric flow rate of the liquid delivered from the outlet.

14. The adjustable flow restrictor of claim 12, wherein the pathway comprises a helical flow path located between the truncated internal threads of the nut and the external threads of the shaft for the adjustment screw that travels about the shaft of the adjustment screw along a segment thereof installed within the nut.

15. The adjustable flow restrictor of claim 14, wherein:
adjusting the adjustment screw to retract the shaft thereof relative to the nut decreases the length of the pathway through decreasing the helical flow path between the truncated internal threads of the nut and the external threads of the shaft for the adjustment screw with respect to a number of turns therein, resulting in a decrease in duration of liquid contact with the pathway and frictional energy losses of the liquid as the liquid traverses the pathway and a corresponding increase in the volumetric flow rate of the liquid delivered from the outlet; and
adjusting the adjustment screw to progress the shaft thereof into the nut increases the length of the pathway through increasing the helical flow path between the truncated internal threads of the nut and the external threads of the shaft for the adjustment screw with respect to a number of turns therein, resulting in an increase in duration of liquid contact with the pathway and frictional energy losses of the liquid as the liquid traverses the pathway and a corresponding decrease in the volumetric flow rate of the liquid delivered from the outlet.

16. A flow control device, comprising:
an adjustable flow restrictor, comprising:
a nut including a first end adapted to receive a liquid therein and a second end,
an adjustment screw being adapted to install into the nut from the second end thereof, the adjustment screw and the nut being configured to define a pathway therebetween, whereby adjustment of the adjustment screw relative to the nut varies the pathway with respect to a length thereof,
a sleeve including a first end and a second end, the sleeve being adapted at the first end thereof to fit over the adjustment screw and mate with the nut at the second end thereof, whereby the nut and the sleeve define a chamber with an outlet, and
the pathway being adapted to receive therein a liquid conveyed to the nut at the first end thereof and communicate the liquid to the chamber for exit therefrom via the outlet, whereby adjusting the length of the pathway regulates the liquid traversing the pathway with respect to volumetric flow rate such that the liquid exiting the outlet flows therefrom at a desired volumetric flow rate;
a housing defining a restrictor chamber configured to incorporate therein the adjustable flow restrictor, the restrictor chamber including a liquid inlet, a liquid outlet passage, and an opening configured to receive the adjustable flow restrictor therethrough;
the nut of the adjustable flow restrictor being insertable into the restrictor chamber of the housing until the nut at the first end resides adjacent the liquid inlet of the restrictor chamber;
the sleeve of the adjustable flow restrictor being insertable into the restrictor chamber of the housing until the sleeve fits over the adjustment screw and mates with the nut to define the chamber of the adjustable flow restrictor, whereby, upon incorporation of the adjustable flow restrictor into the restrictor chamber, the outlet from the chamber of the adjustable flow restrictor aligns with the liquid outlet passage from the restrictor chamber of the housing.

17. The flow control device of claim 16, wherein:
the adjustment screw comprises a head and a shaft extending from the head, whereby the shaft includes external threads;
the nut defines a passage therethrough including truncated internal threads;
the adjustment screw at the shaft thereof being adapted to install into the nut from the second end thereof, whereby the truncated internal threads of the nut and the external threads of the shaft for the adjustment screw are spaced apart to form the pathway; and
the length of the pathway, upon incorporation of the adjustable flow restrictor into the restrictor chamber, being adjustable to produce a desired volumetric flow rate for a liquid flowing through the flow control device.

18. The flow control device of claim 17, wherein:
adjusting the adjustment screw relative to the nut to decrease the length of the pathway results in an increase in the volumetric flow rate of the liquid delivered from the outlet of the adjustable flow restrictor; and
adjusting the adjustment screw relative to the nut to increase the length of the pathway results in a decrease in the volumetric flow rate of the liquid delivered from the outlet of the adjustable flow restrictor.

19. The flow control device of claim 17, comprising an on/off flow control disposed in an outlet channel of the housing connected with the liquid outlet passage from the restrictor chamber of the housing.

20. The flow control device of claim 19, wherein, upon activation of the on/off flow control:
- a liquid via the liquid inlet of the restrictor chamber enters the adjustable flow restrictor at the first end of the nut;
- the liquid flows through the pathway of the adjustable flow restrictor to produce the desired volumetric flow rate for the liquid;
- the liquid flows from the pathway into the chamber of the adjustable flow restrictor;
- the liquid flows from the chamber via the outlet thereof into the liquid outlet passage from the restrictor chamber of the housing;
- the liquid flows through the liquid outlet passage and into the outlet channel of the housing where the liquid flows past the on/off flow control; and
- the liquid at the desired volumetric flow rate flows from the housing using the outlet channel.

* * * * *